United States Patent [15] 3,693,831
West [45] Sept. 26, 1972

[54] CLOSURE FOR OPEN-MOUTH VESSELS

[72] Inventor: Denny M. West, Trussville, Ala.

[73] Assignee: Thiokol Chemical Corporation, Bristol, Pa.

[22] Filed: July 30, 1970

[21] Appl. No.: 59,494

[52] U.S. Cl. .................. 220/24.5, 215/52, 220/46 P
[51] Int. Cl. ............................................. B65d 39/12
[58] Field of Search ..220/24.5, 26 SA, 46 P; 215/52, 215/37 A

[56] References Cited

UNITED STATES PATENTS

| 658,588 | 9/1900 | Reynolds et al. | 220/46 P |
|---|---|---|---|
| 2,559,564 | 7/1951 | Sperling | 220/46 P |
| 2,697,534 | 12/1954 | Topley | 220/49 P X |
| 2,156,260 | 5/1939 | Crothers | 220/24.5 X |
| 2,737,205 | 3/1956 | Stringfield | 215/37 A UX |
| 3,121,310 | 2/1964 | Rice | 220/24.5 X |

Primary Examiner—Joseph R. Leclair
Assistant Examiner—James R. Garrett
Attorney—William R. Wright, Jr.

[57] ABSTRACT

A closure for the opening in open-mouth vessels such as bottles, jars, rocket motor nozzles, casks and the like which includes a plug member and an inflatable ring located near the inner end of the plug. The plug is slid in place in the usual manner and the ring is then inflated to both hold the plug in place in a positive manner and to provide a very effective seal where the ring bears upon the vessel.

5 Claims, 3 Drawing Figures

PATENTED SEP 26 1972

3,693,831

Denny M. West INVENTOR.

BY

AGENT

CLOSURE FOR OPEN-MOUTH VESSELS

The present invention applies to an improved plug for closing the openings in open-mouthed vessels or containers. It also applies to an improved closure plug used to close the nozzle opening of a rocket motor.

Closure members for open-mouthed vessels are ordinarily made of rubber, cork, plastic or the like and are commonly pressed tightly into the opening depending for their sealing effect upon the pressure of the plug against the interior wall of the opening. However, since the closure members of this sort rely solely on the friction existent between them and the wall to keep them in place, they tend to work loose and to push out from the urging of any pressure within the container, from contraction or shrinkage of the plug due to temperature changes, from material deterioration or from contact with fluids contained in the vessel. Also, the force used to insert the plug produces an outward push and downward drag upon the inner wall of the vessel both of which may damage the wall as could be the case with a rocket motor nozzle wherein the mechanical stresses involved might crack the nozzle lining or scuff it or otherwise damage the nozzle's surface. The present invention provides an improved plug which eliminates most of these problems by providing a plug which slips easily into place with no pressure and no friction on the wall of the vessel during insertion but which is then sealed effectively and prevented from withdrawal by the inflation of an annular tube or ring from the exterior of the plug. Closure members are useful for preventing of the passage of moisture, air or foreign matter into a container in order to protect its contents during periods of storage and shipping. They also prevent loss of the contents due to spilling, evaporation or deterioration due to exposure. In the case of a rocket motor, the closure member not only protects the propellant contained in the motor from physical damage from foreign objects or from matter floating in the air, but also protects the propellant from exposure to moisture from the atmosphere which might otherwise interfere with its proper ignition and burning.

Accordingly, it is an object of the present invention to provide a plug for the neck or outlet of an open-mouthed vessel or container wherein the plug is sealed to the wall and is prevented from extraction by a ring on the plug expanded against the wall after the plug has been inserted.

It is also an object of the present invention to provide a plug of the foregoing type which substantially eliminates the possibility of damage to the wall of the vessel during installation or withdrawal of the plug by eliminating friction between the plug and the wall through deflation of the plug's sealing ring.

It is also an object of the present invention to provide a plug of the foregoing type which is easily and quickly removed from the container without the need to use a special tool such as a puller, corkscrew or other extracting means.

Other objects and advantages of the present invention will become apparent from the description and drawings which follow hereinafter.

Figure 1:
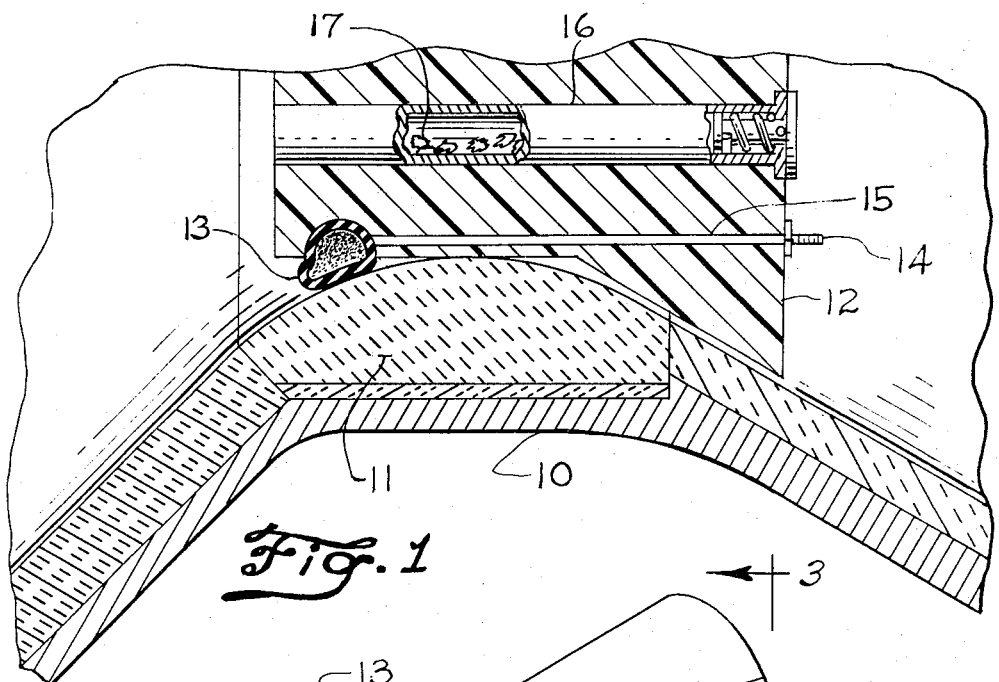
FIG. 1 is a partial cross section of a rocket motor nozzle showing a plug in place therein with its ring inflated.
Figure 2:
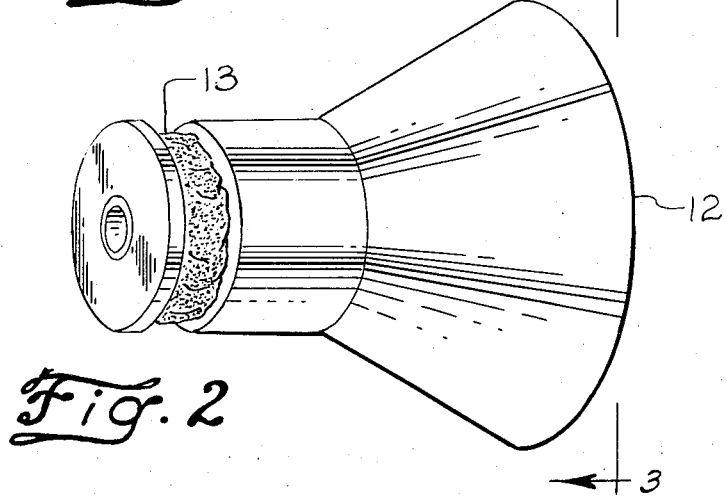
FIG. 2 is a perspective exterior view of the plug showing the ring deflated and the plug ready for insertion in the vessel.
Figure 3:
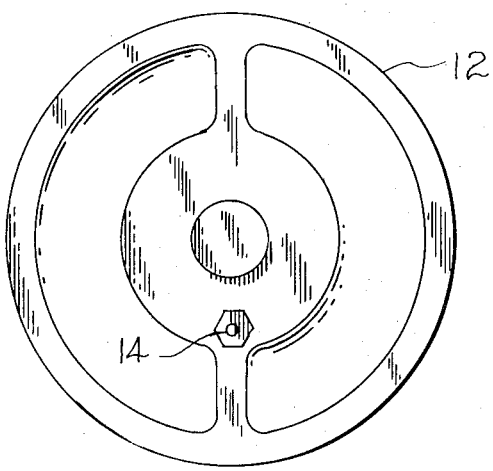
FIG. 3 is an exterior end view of the plug taken in the direction of the arrows 3—3 and showing the inflating fluid supply entrance or valve.

A preferred embodiment of the present invention is shown principally in FIG. 1 in which a rocket motor nozzle is shown having an annular outer wall 10, an annular nozzle wall or liner 11, a plug 12 inserted in the nozzle just loosely enough to prevent friction and an inflatable annular tube or ring 13 of a flexible fluid tight material such as rubber, neoprene, polyethylene or the like. An exterior view of plug 12 is shown in FIG. 2 in which the ring 13 is shown in a deflated condition and an outer end view is shown in FIG. 3 in which entrance port or valve 14 is indicated, valve 14 being a spring-loaded air check valve such as is used in connection with automotive tires. A supply conduit 15 for fluid to inflate ring 13 leads from ring 13 outwardly through the plug 12 to entrance port 14 and communicably connects to both as shown in FIG. 1.

The plug 12 in itself is intended to be made of one of the common plastics such as polystyrene or the like although other materials may be used such as aluminum or a very dense wood such as lignum vitae or hard maple. Materials having a significant degree of porosity are to be avoided since one important purpose of the plug is to keep out moisture and foreign matter brought in by the surrounding air. In the center of plug 12 is a tube 16 open at its left end in FIG. 1 and sealably closed at its right end and containing a dessicant 17 which is exposed to the air from the interior of the rocket motor and absorbs moisture from the air, thus keeping the propellant at an acceptable level of moisture content. In the case of plugs for containers other than rocket motor chambers, the dessicant 17 and its tube 16 are not used unless some particular use or contents of the container makes it necessary.

In operation, the dessicant tube 16 is first closed tightly and the ring 13 is deflated to the extent that there is no drag on the container as the plug 12 enters it. The plug 12 is then passed through the neck nozzle or constricted portion of the container opening until its larger end just touches or becomes in close proximity to the outer or upper portion of the opening, which is known as the expansion portion of the nozzle in the case of a rocket motor. When this has been accomplished, an air hose (not shown) is connected to valve 14 and ring 13 is inflated to a pressure of from 5 to 25 pounds per square inch. This causes it to expand until it presses against the interior of the container neck and its groove in plug 12 in the manner shown in FIG. 1 and thereby creates an effective annular seal. Hydraulic fluid pressure could also be used to expand ring 13 and the extent of the pressure applied in any event is determined by the requirements of the individual container and its use and contents.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. A closure plug for an open-mouthed vessel having a zone of lesser inside diameter than the overall inside diameter of the mouth, said plug comprising a body of revolution having a large end and a small end with the small end adapted to just pass through the open mouth of the vessel without friction, a pressure expandable ring near the small end of the plug and encircling it and so located longitudinally of the plug as to bear upon the inner face of the open mouth just inside of its zone of lesser diameter, a dessicant contained in a chamber in the plug and exposed to the interior of the vessel and accessible from the exterior of the vessel with the plug in place therein, and means for expanding said ring, whereby the ring expands against the said inner face of the vessel mouth and against the plug and creates an annular seal therebetween.

2. The invention set forth in claim 1 with the means for expanding the ring including a pressurized fluid supply, and means connecting the fluid supply to the ring.

3. The invention set forth in claim 2 with the last-named means including a fluid check valve and fluid supply attachment means, and a communicating conduit between the fluid valve and the ring.

4. The invention set forth in claim 2 with the pressurized fluid supply comprising a pressurized air supply, an air check valve adapted for optional attachment thereto and detachment therefrom and a communicating conduit between the air valve and the ring.

5. A closure plug for the nozzle of a rocket motor said nozzle having a restricted zone extending peripherally about its inner face, said plug comprising a body of revolution having a truncated conical end and a cylindrical end with the cylindrical end adapted to just pass through the nozzle without friction, a pressure expanding ring encircling the cylindrical end and so located longitudinally of the plug as to bear upon the nozzle interior just inside of its minimum diameter of its restricted zone, a dessicant contained in a chamber in the plug and exposed to the interior of the vessel and accessible from the exterior of the vessel with the plug in place therein, and means for expanding said ring, whereby the ring expands against the said inner wall of the vessel and against the plug and creates an annular seal therebetween.

* * * * *